United States Patent [19]
Mallon et al.

[11] Patent Number: 5,365,148
[45] Date of Patent: Nov. 15, 1994

[54] SINUSOIDAL INDUCTORLESS DIMMER PROVIDING AN AMPLITUDE ATTENUATED OUTPUT

[75] Inventors: Paul E. Mallon; Gary S. Bateman, both of Paso Robles, Calif.

[73] Assignee: Electronics Diversified, Inc., Hillsboro, Oreg.

[21] Appl. No.: 978,816

[22] Filed: Nov. 19, 1992

[51] Int. Cl.$^5$ ............................................. G05F 1/00
[52] U.S. Cl. ............................ 315/194; 315/DIG. 4; 315/307; 315/209 R; 323/242
[58] Field of Search ............. 315/DIG. 4, 307, 209 R, 315/287, 194; 323/322, 242

[56] References Cited

U.S. PATENT DOCUMENTS

| | | | |
|---|---|---|---|
| 4,617,508 | 10/1986 | Bloomer | 315/194 X |
| 4,633,161 | 12/1986 | Callahan et al. | 315/194 X |
| 4,788,474 | 11/1988 | Kokubu et al. | 315/287 X |
| 5,045,774 | 9/1991 | Bromberg | 323/322 |

Primary Examiner—Robert J. Pascal
Assistant Examiner—Haissa Philogene
Attorney, Agent, or Firm—Robert L. Harrington

[57] ABSTRACT

A dimmer control circuit for application to a load bank produces a sinusoidal power wave form exhibiting the desirable characteristic of suitable rise and fall times producing little or no audible or radio frequency interference. A pair of MOS-FET power devices operate in a linear mode and attenuate respective half-cycles of a single phase power line as a function of a dimmer control signal applied thereto. The device includes a mechanism for avoiding damage to the power MOS-FET by controlling conditions under which a signal change is applied to the gates of the MOSFETs, and by imbalanced attenuation between the MOS-FETs through the range of the dimmer control signal.

14 Claims, 4 Drawing Sheets

SINUSOIDAL INDUCTORLESS DIMMER PROVIDING AN AMPLITUDE ATTENUATED OUTPUT

BACKGROUND OF THE INVENTION

The present invention relates generally to power control circuits, and particularly to dimming circuits for lighting and other applications.

Dimming circuits have used SCRs to "chop off" or drop to zero potential a sinusoidal input wave during each half-cycle in manipulation of energy delivered to, for example, a lighting device. The smooth contoured sinusoidal alternating current power source is dropped to zero potential at selected phase angles, once each half-cycle, to selectably control the magnitude of energy applied to a load. By suddenly dropping the potential presented to the load, however, the cyclic wave form applied to the load is not properly characterized as a sinusoidal wave form. In deviating from a generally sinusoidal power wave form, such dimming functions have found deficiencies. Such dimming methods tend to have little control in the sudden shutoff phase and have required inductors to better control, i.e., extend, ramp time. More particularly, when suddenly dropping the potential of the potential applied to the load, the sudden change or step function in voltage and current flow produces undesirable consequences. Use of an inductor as a solution to step-voltage conditions introduces undesirable radio frequency interference. Furthermore, the basic "chop off" nature of the dimming function undesirably vibrates light filaments. This filament vibration causes both audible and RF interference and is desirably avoided.

More recently, use of insulated gate bipolar transistors IGBTs has been introduced in dimming functions. U.S. Pat. No. 4,633,161 issued Dec. 30, 1986 to Callahan shows an improved inductorless phase control dimmer power stage with semi-conductor controlled voltage rise time. The Callahan configuration only attempts to electronically simulate the prior SCR with inductor chop off mode of operation, but with improved ramp control during shutoff periods.

The background portion of the Callahan patent covers the history of dimming techniques including one approach to the "chokeless" dimmer as a high wattage power transistor operating in a pure linear mode. FIG. 2 of Callahan illustrates the output of a high wattage power transistor operating in a pure linear mode, however, FIG. 2 of Callahan illustrates an "amplitude clamping" function. Amplitude attenuation by clamping, while superior over phase control amplitude chopping, still introduces some degree of harmonics into the load circuit.

Callahan discusses some heat dissipating issues associated with such linear dimmers, and states that as much as ten times more heat must be dissipated from a linear dimmer relative to that of conventional phase control dimmers. In FIGS. 3A and 3B of Callahan, Callahan proposes pulse width modulation wave forms for application to the load as a solution to heat dissipation issues. FIG. 3B shows the result of introducing an inductor in series with the pulse width modulated wave form prior to application to a load. The use of an inductor, however, to produce such a synthesis of an amplitude-modulated sinusoidal wave form undesirably produces radio frequency interference.

Thus, there remains a need for an "inductorless" dimmer circuit having acceptable rise and fall times, but without excess heat dissipation requirements relative to prior phase control dimmer units. In this manner, the advantages of an inductorless dimmer function are achieved, but without the associated heat dissipation problems. The subject matter of the present invention provides such a dimmer control function.

SUMMARY OF THE INVENTION

A preferred embodiment of the present invention in a first aspect is a dimmer control circuit receiving a dimmer control signal and a sinusoidal power source, and applying an amplitude attenuated form of the sinusoidal power source to a load bank. The attenuated power source as applied to the load bank retains or improves the rise and fall time of the original power source and thereby minimizes or eliminates undesirable effects associated with sharp rise and fall events in a cyclic power source.

In accordance with one aspect of the present invention, a method of operating a MOS-FET power device in a dimmer circuit includes controlled change in application of a turn on or turn off signal thereto by reference to a phase of the power source to be attenuated thereby. More particularly, a change in the gate signal applied to the MOS-FET is permitted only under such conditions that will avoid damage to the MOS-FET. In accordance with the preferred embodiment of the present invention, a zero crossing in the sinusoidal power source allows change in the gate signal applied to the MOS-FET and thereby avoids damage to the MOS-FET. Furthermore, by defining a "damage zone" in the signal applied to the gate of the power MOS-FET, damage is avoided to the MOS-FET by applying a gate signal either exceeding the damage zone or falling below the damage zone. In this manner, damage is avoided to the power MOS-FET.

In accordance with another aspect of the present invention, the dimmer circuit employs two power transistor devices, e.g., power MOS-FETs, with each device attenuating a corresponding one of the half-cycles of the power signal. To avoid excess heat dissipation requirements, one MOS-FET device is more greatly prebiased relative to that of the other MOS-FET device. As the dimmer control function moves from a full attenuation to a full illumination condition, both MOS-FETs begin with full attenuation, but one of the MOS-FETs begins introducing a voltage potential in its associated half-cycle prior to the other MOS-FET device. Eventually, as the dimmer control signal reaches full illumination, both MOS-FETs deliver full potential in each corresponding half-cycle. Operation in this imbalanced method of attenuation avoids operation of both MOS-FET devices concurrently at the maximum heat producing point, i.e., approximately 50%, in their linear mode of operation. As a result, overall heat dissipation requirements are reduced substantially relative to operation of the MOS-FET with balanced attenuation in response to the dimmer control signal.

The subject matter of the present invention is particularly pointed and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION OF THE PREFERRED EMBODIMENT

Figure 1:
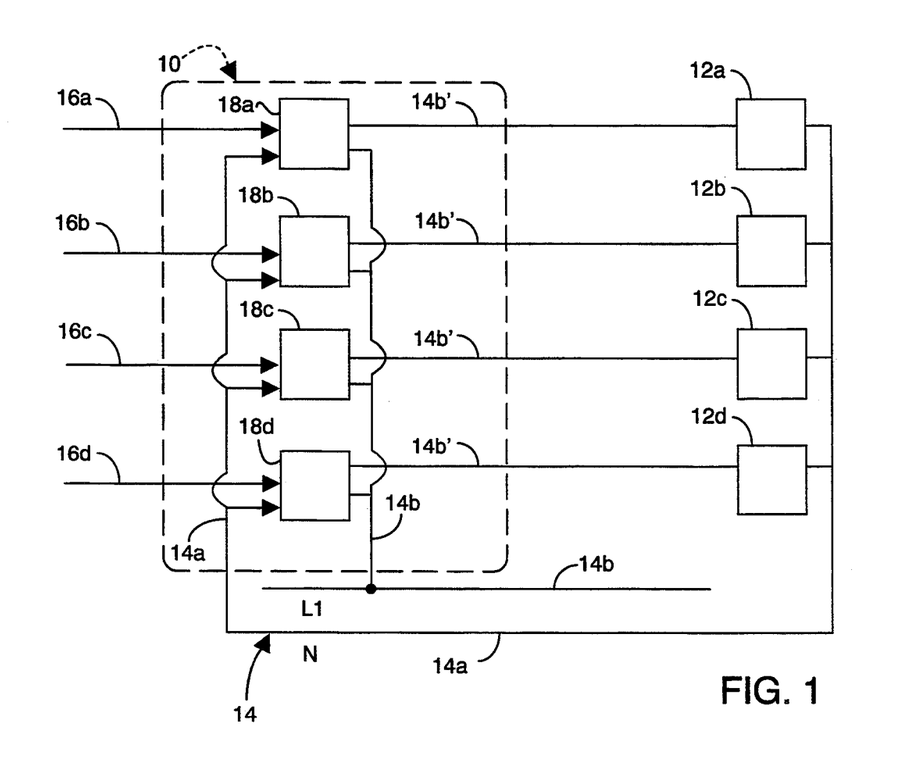
FIG. 1 is a block diagram of a lighting control arrangement including a collection of dimming circuits in accordance with a preferred embodiment of the present invention.

FIG. 1 illustrates a dimmer module 10 for dimming control relative to four load banks 12, individually 12a–12d. Load banks 12 can be a series of incandescent lamps mounted in parallel fashion, or could be other devices including induction motors or transformers. The dimmer module 10 receives a power bus 14 including a neutral line 14a, also designated N, and a single phase line 14b, also designated L1. Dimmer module 10 further receives four pulse width modulated signals 16, individually 16a–16d, representing an industry standard dimming function, i.e., SCR control, to be applied to the load banks 12a–12b, respectively. Within dimmer module 10, four dimmer circuits 18a–18d each receive the single phase line 14b and deliver corresponding load lines 14b' to respective load banks 12. Thus, each of a load lines 14b' are controllably attenuated in amplitude relative to the single phase line 14b, the attenuation being a function of the corresponding one of pulse width modulated signals 16. The neutral line 14a is applied directly to each of load banks 12a–12d, and also to each of the dimmer circuits 18. The use of neutral line 14a by dimmer circuits 18a–18d is as an input control signal, the dimmer circuits 18 have no control function relative to neutral line 14a.

As may be appreciated, each of the pulse width modulated signals 16a–16d are applied to respective ones of the dimmer circuits 18a–18d for determining the magnitude of energy applied to the respective load banks 12a–12d. The arrangement of FIG. 1 is generally conventional in the art and may be varied according to known practice. For example, the dimmer module 10 may be responsible for fewer or more load banks 12 and may include other features not discussed herein.

Figure 2:
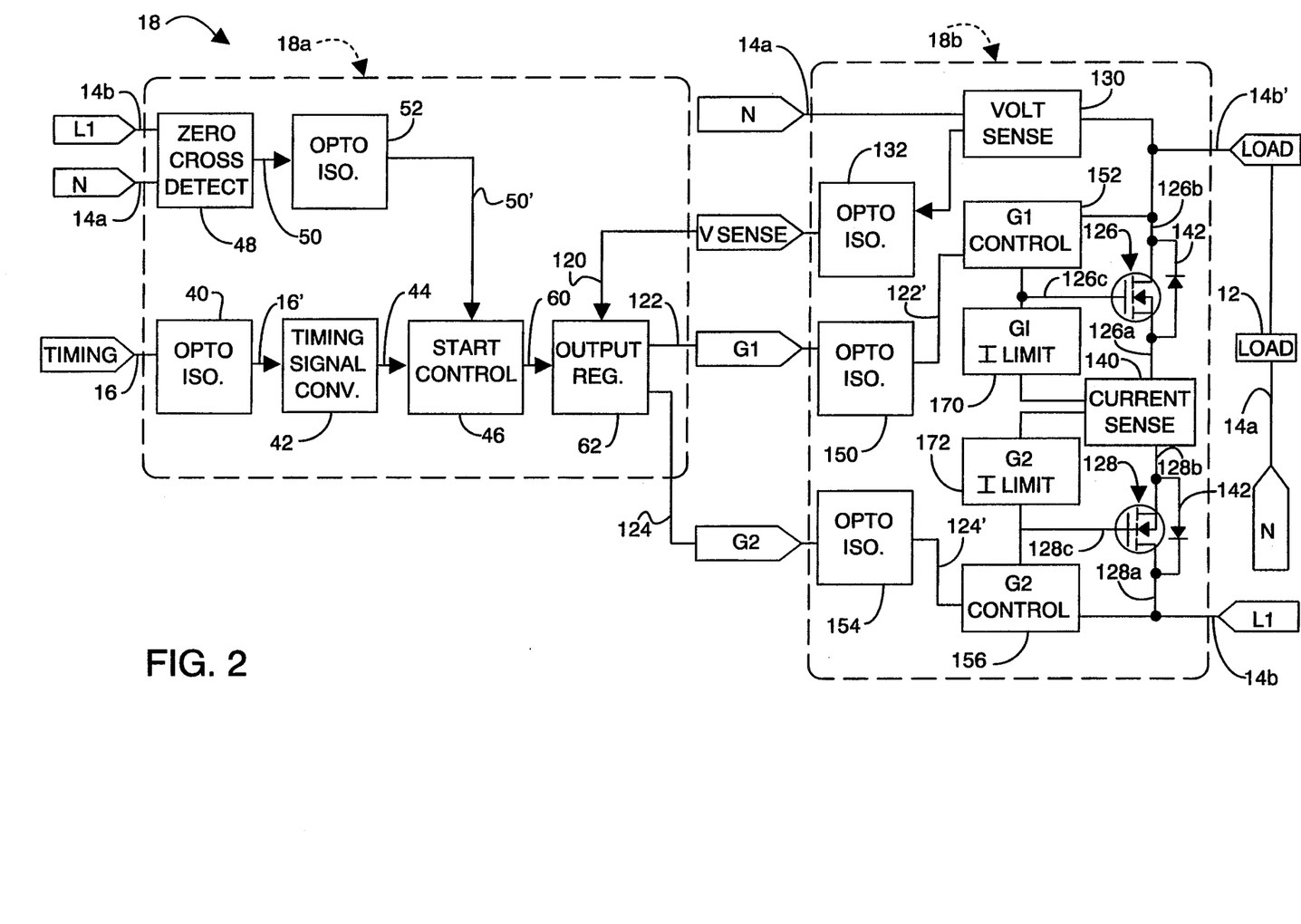
FIG. 2 is a block diagram of the dimming circuit of FIG. 1.

FIG. 2 further illustrates each of the dimmer circuits 18. In FIG. 2, the dimmer circuit 18 is shown again in greater detail including application to a load 12 by way of load line 14b'. Circuit 18 includes a logic and drive section 18a and a power section 18b. Logic and drive section 18a receives the industry standard pulse width modulated signal 16 and converts it into suitable control signals (122 and 124) for application to the power section 18b. Power section 18b is responsible for receiving and attenuating line 14b and delivering the signal 14b' to the load 12. As may be appreciated, the sections 18a and 18b of dimmer circuit 18 may be separate components such that damage to one, typically section 18b, does not require replacement of the entire circuit 18. Thus, it is contemplated that the section 18b be provided as a separately mountable plug-in module which may be replaced in the event of damage. As will be discussed more fully hereafter, however, the potential for damage to section 18b is minimized in accordance with its operation under the present invention.

Circuit 18 receives pulse width modulated signal 16 at optoisolator 40 which in turn delivers the pulse width modulated signal 16' to a timing signal convertor block 42. The timing signal convertor block 42 converts the dimming function represented by pulse width modulated signal 16 into a scaled DC signal 44, i.e., corresponding in magnitude to the dimming function represented by pulse width modulated signal 16. As may be appreciated by those skilled in the art, this timing signal converter block 42 may be implemented by integrating the pulse width modulated signal 16 into a capacitor (not shown). The scaled DC signal 44 is then applied to a start control block 46. Start control block 46 will be described in greater detail hereafter.

Circuit 18 receives, as reference signals, at zero cross detect block 48 the lines 14a and 14b of power bus 14. Zero cross detect block 48 produces a zero cross timing signal 50 corresponding to transition of the voltage potential on line 14b through the potential on line 14a. Timing signal 50 is then applied, by way of optoisolator 52, as the timing signal 50' to the start control block 46.

As will be discussed more fully hereafter, power section 18b employs MOS-FETs 126 and 128 in a linear mode to controllably deliver power to the load 12. As may be appreciated by those skilled in the art, MOS-FETs are susceptible to damage under certain conditions and have, heretofore, not been widely used in a linear mode for power dimming applications. Generally, MOS-FETs have been used in a switching mode for power applications, but have suffered damage under certain conditions when used in a linear mode. A MOS-FET will experience deterioration, but more often complete destruction, when a turn off or turn on signal is applied to the MOS-FET at a time when a large power potential exists across the device.

A MOS-FET is vulnerable to destruction when the control signal attempts to drive the MOS-FET into a power delivery mode relatively small as compared to the power potential thereacross. If a large power potential exists across the device, a "damage zone" exists in the linear range of the device. For example, when a 110 volt power potential lies across a MOS-FET, there exists a possibility of destroying the MOS-FET when the control signal would, in the normal linear mode operation, attempt to deliver between zero and 15 volts output. Driving the MOS-FET within or through this damage zone destroys the MOS-FET.

In accordance with the present invention, start control block 46 insures that a turn off or a turn on signal applied to the MOSFETs of power section 18b occurs concurrently with a zero crossing in the power bus 14. The start control block 46 also avoids driving the MOS-FETs of the power section 18b through the associated damage zone. More particularly, the control signal applied will not operate the MOS-FETs 126 and 128 in this damage zone by virtue of a "jump-up" control feature discussed more fully hereafter. Generally, start control block 46 uses the timing signal 50, representing zero crossings in the power bus 14, to determine when a control signal 60 may be changed. Thus, start control block 46 provides a validated control signal 60 for application to an output regulator 62.

Figure 3:
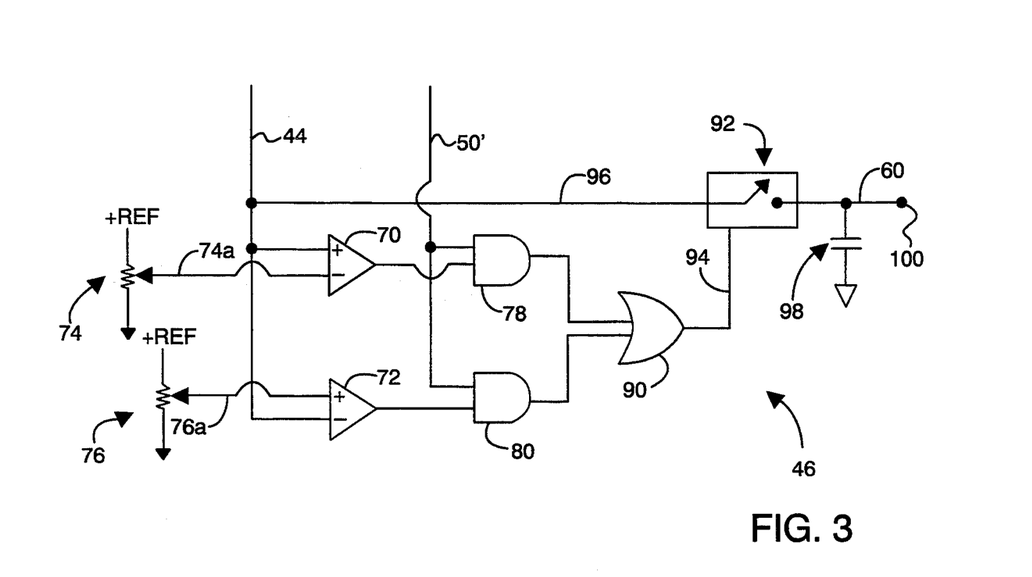
FIG. 3 is a schematic diagram of a start control block of the dimming circuit of FIG. 2.

FIG. 3 more fully illustrates the components of start control block 46. In FIG. 3, start control 46 includes a minimum on level comparitor 70 and an off level comparitor 72. The signal 44 is applied to the positive input of comparitor 70 and to the negative input of comparitor 72. A first potentiometer 74 tied between a reference voltage and ground potential applies its wiper 74a to the negative input of comparitor 70. A second potentiometer 76 tied between a reference voltage and ground applies its wiper 76a to the positive input of comparitor 72. An AND gate 78 receives on one input the output of comparitor 70 and on the other input the timing signal 50'. A second AND gate 80 receives on a first input the output of comparitor 72 and on the other input the timing signal 50'. The outputs of AND gates 78 and 80 are applied as inputs to an OR gate 90. A sample and hold device 92, available under National Semiconductor product number LF398N, receives on its logic or enable input 94 the output of OR gate 90. The signal 44 is applied directly to the voltage input 96 of sample and hold device 92. A capacitor 98 is tied between the output 100 of sample and hold device 92 and ground potential whereby the output terminal 100 of device 92 carries the validated controlled voltage signal 60 for application to the output regulator 62 (FIG. 2).

In operation, start control block 46 maintains the signal 60 at the previous valid signal level and, when enabled under appropriate conditions, allows the signal 60 to assume as a valid signal the present level of signal 44. Thus, to deliver the signal 44 through start control block 46 as the validated signal 60, the signal 44 must be outside the damage zone, i.e., above a selected minimum on level or completely off as established by comparators 70 and 72, and occur in conjunction with a zero crossing in power bus 14. In this manner, start control block 46 only presents a valid change in the control voltage signal 60 and thereby protects the MOS-FETs of power section 18b against damage.

Start control block 46 provides the additional advantage of avoiding a "cold start" or "filament inrush" condition associated with incandescent lamp filaments. A cold filament draws large current because of low resistivity at initial startup. Because the start control block 46 only turns on the MOS-FETs at a time of zero crossing in the power bus 14, the voltage applied to the lamp filaments begins essentially at zero and thereby avoids large magnitude current flow during a potentially damaging cold filament inrush condition.

Output regulator 62 performs a feedback function to maintain a constant voltage output from power section 18b. Power section 18b provides a voltage sense signal 120 representative of the actual voltage output provided by power section 18b, i.e., the voltage present on line 14b'. The signal 120 may be a scaled version of the actual voltage present on line 14b'. Output regulator 62 then compares the signals 120 and 60 in producing gate signals 122 and 124 which ultimately drive the MOS-FETs 126 and 128, respectively, of power section 18b. Thus, output regulator 62 provides a voltage regulation function whereby the gate signals 122 and 124 are adjusted in feedback fashion by comparison of the voltage sense signal 120 to the controlled voltage signal 60 until the desired voltage is present on the load line 14b'.

As a result of the voltage regulation provided by output regulator 62, constant illumination is maintained despite certain variations in the power bus 14. More particularly, even if the power bus 14 experiences an over-voltage or under-voltage condition, the illumination provided circuit 18 remains constant because output regulator 62 will sense the drop or rise in voltage by way of signal 120 relative to the selected illumination as represented by signal 60. In response, output regulator 62 boosts or decreases the gate signals 122 and 124 in feedback fashion until the appropriate voltage is presented on load line 14b'. This feedback feature is limited, however, by total available energy in the power bus 14. For example, at a full illumination condition dimmer circuit 18 cannot maintain full illumination in the event of a under-voltage condition on bus 14.

Power section 18b includes a voltage sense block 130 monitoring the line 14b' and delivering by way of optoisolator 132 the voltage sense signal 120 to output regulator 62. Voltage sense block 130 may be implemented as a voltage divide circuit scaling the voltage present on line 14b' for suitable presentation to the output regulator 62. As may be appreciated, the scaling function provided by voltage sense block 130 should be compatible with the scale in which the control voltage signal 60 operates.

MOS-FETs 126 and 128 lie in a common source configuration, i.e., the source lead 126a of MOS-FET 126 coupled to the source lead 128a of MOS-FET 128. The drain lead 126b of MOS-FET 126 ties directly to the line 14b' while the drain lead 128b of MOS-FET 128 ties directly to the line 14b. A current sense block 140 lies in series between the source leads 126a and 128a and may be implemented as a very low resistance device providing a small voltage drop thereacross representative of current flowing between MOS-FETs 126 and 128. Each of MOS-FETs 126 and 128 includes a reversing diode 142 coupling its source lead to its drain lead for carrying current during an opposing half-cycle. More particularly, the MOS-FET 126 operates in its linear mode during a first half-cycle and allows current to pass through its diode 142 during the second half-cycle. Conversely, the MOS-FET 128 operates in its linear mode during the second half-cycle while its diode 142 passes current during the first half-cycle.

Gate signal 122, as produced by output regulator 62, is applied through an optoisolator 150 as the gate signal 122' to a gate control block 152. Similarly, the gate signal 124, as provided by output regulator 62, is provided by way of an optoisolator 154 to a gate control block 156 as the signal 124'.

Gate control blocks 152 and 156 maintain a positive differential signal on the gates 126c and 128c for MOS-FETs 126 and 128, respectively. The amount of offset provided by gate control blocks 152 and 156 relative to the forward bias provided by the gate signals 122' and 124' determines the magnitude of attenuation provided by the MOS-FETs 126 and 128, respectively. In switching mode applications of MOS-FETs, this general configuration is referred to as a "high side driver." In the present application, however, MOS-FETs 126 and 128 operate in their linear mode. Accordingly, the arrangement of gate control blocks 152 and 156 may be more appropriately referred to as a "linear high side driver."

Figure 4:
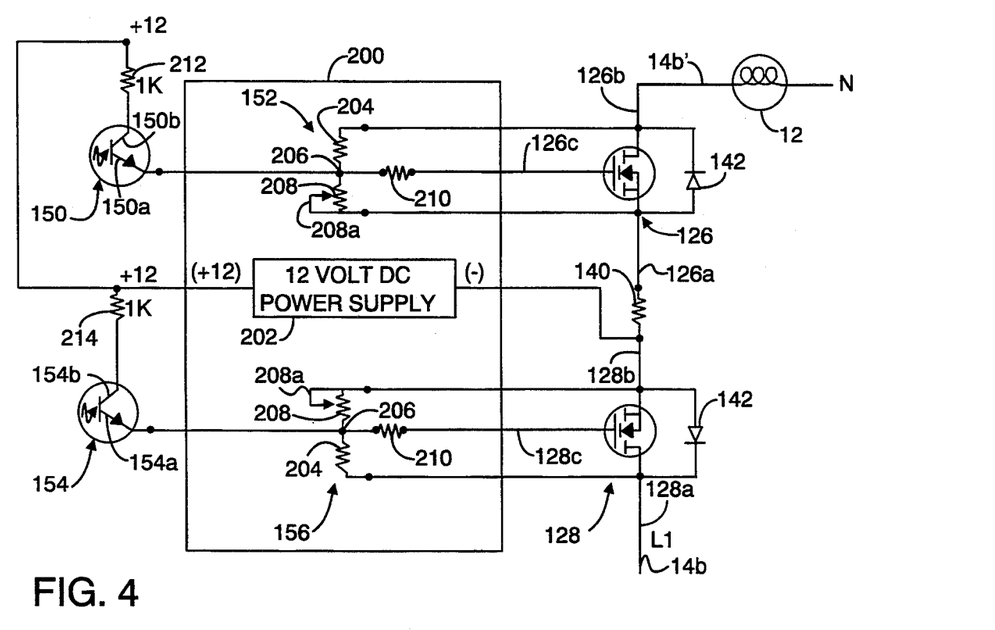
FIG. 4 is a schematic diagram of a gate control block of the dimming circuit of FIG. 2.

FIG. 4 illustrates schematically a suggested implementation of the gate control blocks 152 and 156. In FIG. 4, a gate biasing block 200 includes the gate control blocks 152 and 156 and also an isolated 12 volt DC power supply 202. Each of gate control blocks 152 and 156 includes a resistor 204 tied between the drain of the corresponding one of MOS-FETs 126 and 128 and a node 206. The node 206 couples to the source of the corresponding one of MOS-FETs 126 and 128 by way of the fixed leads of a potentiometer 208. The wiper 208a of each of potentiometer 208 also ties directly to the source of the corresponding one of MOS-FETS 126 and 128. Finally, the node 206 couples to the gate of the corresponding one of MOS-FETs 126 and 128 by way of a gate balancing resistor 210. The emitter 150a of the optoisolator 150 ties directly to the node 206 of gate control block 152. The emitter 154a of the optoisolator 154 ties directly to the node 206 of the gate control block 156. The collector 150b of optoisolator 150 ties through a resistor 212 to the positive lead of the 12 volt DC power supply 202. The collector 154b of the optoisolator 154 ties through a resistor 214 to the positive terminal of the 12 volt DC power supply 202. The negative terminal of the 12 volt DC power supply ties directly to the source 128b of MOS-FET 128.

The resistor networks, each comprising the set of resistors 204, 210, and potentiometer 208, provide a selected prebiasing signal to the gate of the associated one of MOS-FETs 126 and 128. The potentiometer 208 of each gate control block 152 and 156 is adjusted relative to the setting of the potentiometer 208 in the other gate control block to establish an imbalanced prebiasing mode of operation discussed more fully hereafter. Generally, the resistor networks maintain each of the associated MOS-FETs 126 and 128 in a slightly off condition, with one more greatly prebiased than the other. Each of the optoisolators 150 and 154 then inject a given magnitude DC offset into the corresponding node 206 to drive the corresponding one of MOS-FETs 126 and 128 beyond the gate drive threshold and into conduction at a given amplitude.

Returning to FIG. 2, each of MOS-FETs 126 and 128 has associated therewith a current limit block 170 and 172, respectively. The current limit block 170 couples to the gate 126c of MOS-FET 126 and monitors the magnitude of current passing between MOS-FETs 126 and 128, i.e., by way of current sense block 140, and shunts the available gate potential at gate 126 when excess current passes between MOS-FETs 126 and 128. In a similar arrangement for MOS-FET 128, the current block 172 couples to the gate 128c of MOS-FET 128 and monitors by way of signal provided from current sense block 140 the current passing between MOS-FET 126 and 128. When such current is excess, block 172 shunts the gate 128c potential and thereby avoids damage to the MOS-FET 128. As may be appreciated, the current limiting function provided by blocks 170 and 172 is dynamic. Upon cessation of the overcurrent condition, the MOS-FETs 126 and 128 may immediately and smoothly return to normal operation in their linear mode.

Figure 5A:
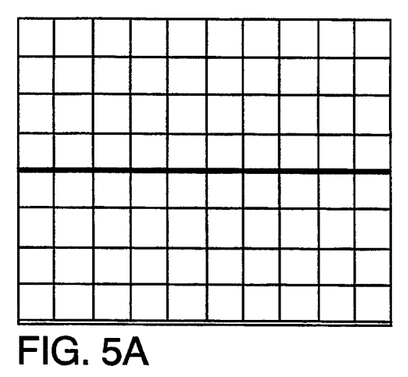
FIGS. 5A–5F illustrate a cycle of an attenuated power source in response to various magnitude dimmer control signals, specifically at 0, 15, 25, 50, 75 and 100 percent illumination commands relative to a full illumination condition.
Figure 5B:
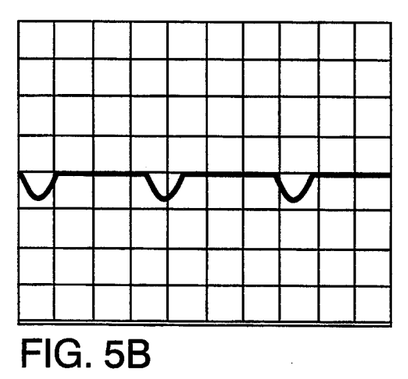
Figure 5C:
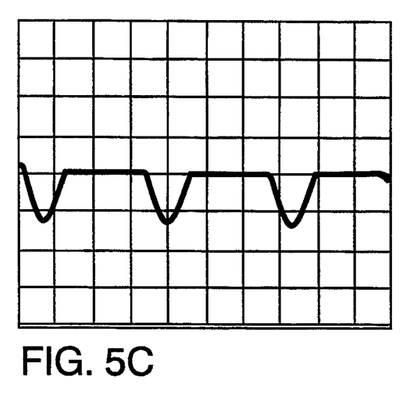
Figure 5D:
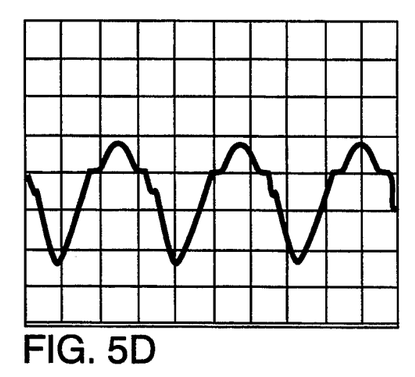
Figure 5E:
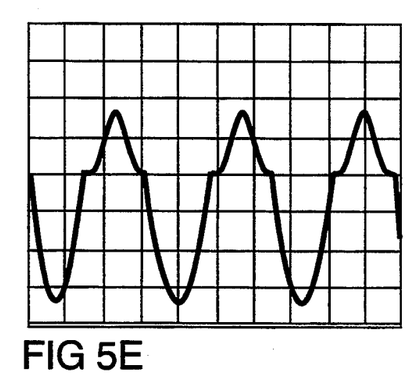
Figure 5F:
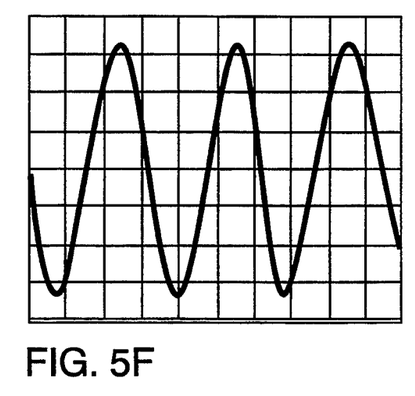

In accordance with one aspect of the present invention, the MOS-FETs 126 and 128 operate differently, i.e., imbalanced attenuation, in response to given magnitudes of the dimming control function signal. In other words, one of MOS-FETs 126 and 128 receives a greater magnitude prebias signal and responds more, e.g., greater attenuation, to lower magnitude dimming commands. FIGS. 5A–5F illustrate the wave forms produced on the load line 14b' in response to 0%, 15%, 25%, 50%, 75% and 100% total power output. In FIG. 5B one of MOS-FETs 126 and 128 is operating to produce a potential in one half-cycle on line 14b'. Even up to 25% total output, as shown in FIG. 5C, the other MOS-FET has not yet entered its linear mode and remains inactive with respect to presentation of potential in the other half-cycle on line 14b'. FIG. 5D illustrates operation at a 50% output wherein the second MOS-FET has begun to present voltage potential in the second half-cycle on the line 14b'. FIG. 5E shows 75% output with an even greater amplitude in the second half-cycle. FIG. 5F shows operation at 100% output wherein both MOS-FETs are fully conducting and delivering full voltage amplitude on the line 14b'.

Semi-conductor devices such as MOS-FETs 126 and 128 exhibit varying heat dissipation requirements throughout their range of linear operation. More particularly, MOS-FETs 126 and 128 require greater heat dissipation at approximately 50% of linear mode operation. As may be appreciated from the above description, MOS-FETs 126 and 128 do not operate concurrently at 50% of their respective linear modes. A potentially large heat dissipation requirement is avoided by not operating MOS-FETs 126 and 128 concurrently at their 50% linear mode operating point. If MOS-FETs 126 and 128 were operated identically in their linear modes, heat management becomes overwhelming at 50% operation. Thus, by providing one of MOS-FETs 126 and 128 with a greater magnitude of prebias, the overall heat dissipation requirement for the dimming circuit 18 is substantially reduced. More particularly, the heat dissipation requirement of the device of the present invention as illustrated herein is believed to be approximately 40% to 50% of that which would be required if MOS-FETs 126 and 128 were operated in a balanced condition, i.e., providing similar attenuation at any given time. It is suggested in implementation of the dimmer circuit 18 that a bonded fin heat sink (not shown) be employed for its high density surface area. In particular, the present invention has been implemented using an AAVID (TM) custom bonded fin available under Part No. 420007U21300.

An important characteristic of the wave forms illustrated in FIGS. 5A–5F is that the rise time and fall time of the signals remain substantially constant, or even increase, and that the wave form retains a generally sinusoidal characteristic as applied to the load 12. As a result of prebiasing provided as described above, the ramp up and ramp down time for the wave forms of FIGS. 5A–5F are substantially constant, and even desirably increase to some extent at maximum attenuation. Some generally flat portions do exist (FIGS. 5D and 5E) between the half-cycles of the wave form. These transition levels are, however, generally well behaved and smooth contoured so as not to present an abrupt change in slope and, therefore, do not present harmonics and other undesirable characteristics as found in prior dimming control devices.

While illustrated herein primarily in the context of illumination dimming functions, the dimming circuit 18 is equally applicable to dimming control over induction loads such as induction motors. Because the power delivered to the load, e.g., an induction motor, is maintained as a substantially sinusoidal wave form, prior deficiencies of switching mode transistors in driving induction motors are avoided. It is believed that the dimming circuit 18 is applicable to even large amperage induction motors.

Thus, an improved dimmer circuit has been shown and described. The dimming circuit of the present invention offers several distinct operational features. First, the dimmer circuit provides a method of operating a MOS-FET wherein zero crossings are detected and a gate signal is changed only to valid magnitudes and at times corresponding to zero crossings to avoid damage to the MOS-FET. Second, the dimmer circuit provides sinusoidal amplitude attenuation. The advantage of sinusoidal amplitude attenuation is "choke-less" dimmer control, i.e., avoids problems of prior devices using chokes for wave form shaping.

The key advantage in the device of the present invention is "silent" dimming. Heretofore, dimming functions have been at best "quiet" dimming wherein the rise and fall time of the phase related voltage chop off function were smoothed by virtue of an inductor or inductor simulation placed in series. Under the present invention, however, the rise and fall times of the attenuated power signal are no less than the rise and fall time of the original line voltage signal. In fact, such rise and fall times are, if anything, improved, i.e., increased, relative to the line voltage rise and fall times. Accordingly, there is no extraneous noise produced under the dimming function of the present invention and silent dimming is achieved. Dimming circuit 18 has little effect on the condition of power bus 14. Circuit 18 introduces minimal feedback harmonics into bus 14 because its output so closely follows the wave form of bus 14, i.e., maintains identical zero crossings and a generally sinusoidal wave form. This method of dimming solves a long felt need in the art previously unavailable through prior methods of dimming which "chop off" the sine wave amplitude during a half-cycle phase angle. Under the present invention, however, the sine wave is attenuated throughout each half-cycle and thereby provides improved power delivery to a load.

It will be appreciated that the present invention is not restricted to the particular embodiment that has been described and illustrated, and that variations may be made therein without departing from the scope of the invention as found in the appended claims and equivalents thereof.

What is claimed is:

1. A dimmer circuit receiving a sinusoidal line power source and driving a load therewith between full power and zero power conditions, the dimmer circuit comprising:

input logic receiving a dimmer control signal representing a magnitude of dimming relative to said full power condition and providing an internal dimmer control signal corresponding to said magnitude of dimming;

a first power attenuation component receiving said sinusoidal power source and providing an amplitude scaled sinusoidal load power source attenuated relative to said line power source, said first power attenuation component having a gate terminal coupled to said internal dimmer control signal and scaling at a given amplitude throughout a first half-cycle of said load power source relative to said line power source as a function of said dimmer control signal;

a second power attenuation component receiving said sinusoidal power source and providing an amplitude scaled sinusoidal load power source attenuated relative to said line power source, said second power attenuation component having a gate terminal coupled to said internal dimmer control signal and at a given amplitude scaling amplitude throughout a second half-cycle of said load power source relative to said line power source as a function of said dimmer control signal; and a biasing arrangement prebiasing said first power attenuation device relative to the second power attenuation device whereby said first power attenuation device scales throughout said first half-cycle differently than said second power attenuation device scales throughout said second half-cycle for a given magnitude of said internal dimmer control signal.

2. A dimmer circuit according to claim 1 wherein said biasing arrangement responds through a range of said internal dimmer control signal by allowing conduction in said first power attenuation component in a first portion of said range and inhibiting conduction in said second power attenuation component through said first portion.

3. A dimmer circuit according to claim 1 wherein each of said power attenuation devices includes a maximum heat producing level of operation and said biasing arrangement avoids concurrent operation of said first and second power attenuation devices at the corresponding maximum heat producing levels of operation.

4. A dimmer circuit according to claim 1 wherein said first and second power attenuation devices are MOS-FET devices.

5. A dimmer circuit receiving a sinusoidal line power source and driving a load therewith between full power and zero power conditions, the dimmer circuit comprising:

input logic receiving a dimmer control signal representing a magnitude of dimming relative to said full power condition and providing an internal dimmer control signal corresponding to said magnitude of dimming;

a power attenuation component receiving said sinusoidal power source and providing an amplitude scaled sinusoidal load power source attenuated in amplitude relative to said line power source, said power attenuation component having a gate terminal coupled to said internal dimmer control signal and scaling at a given amplitude said load power source relative to said line power source as a function of said dimmer control signal throughout at least one half-cycle of said sinusoidal load power source; and a start control for said internal dimmer control signal preventing change in said internal dimmer control signal under conditions associated with damage to said power attenuation device.

6. A dimmer circuit according to claim 5 wherein said start control block permits change in said internal dimmer control signal concurrently with a zero crossing in said line power source.

7. A dimmer circuit according to claim 5 wherein said start control block allows only change in said internal dimmer control signal to a valid value, a valid value being defined as being outside a damage zone associated with the power attenuation device.

8. A dimmer circuit according to claim 5 wherein said start control block presents change in said internal dimmer control signal concurrently with a zero crossing in said line power source and only to a predetermined valid level, a valid level being determined by reference to a damage zone associated with said power attenuation device.

9. A method of attenuating a sinusoidal power signal for application to a load, the method comprising the steps:

receiving an external dimming command at a conversion circuit; converting at said conversion circuit the external dimming command to a presented internal dimming control signal;

validating the presented internal dimming control signal with respect to damage conditions associated with a power attenuation device;

maintaining a last presented valid dimming control signal;

applying the last presented valid dimming control signal to a control terminal of the power attenuation device in such manner to amplitude attenuate the power signal as a function of said last presented valid internal dimming control signal.

10. A method according to claim 9 wherein said validating step comprises the step of validating the presented internal dimming control signal with reference to a time of presentation.

11. A method according to claim 10 wherein said validating step comprises the step of validating the presented internal dimming control signal with respect to a phase angle of the power signal.

12. A method according to claim 11 wherein said validating step comprises the step of validating the presented internal dimming control signal with respect to a zero crossing the power signal.

13. A method according to claim 9 wherein said validating step comprises the step of validating the presented dimming control signal with reference to the magnitude of the internal dimming control signal.

14. A method according to claim 13 wherein said reference to magnitude is a reference to a damage zone associated with the power attenuation device.

* * * * *